(12) United States Patent
Yamasaki et al.

(10) Patent No.: US 10,015,342 B2
(45) Date of Patent: Jul. 3, 2018

(54) INFORMATION PROCESSING APPARATUS AND IMAGE PROCESSING APPARATUS WITH A LINE OF SIGHT DETECTOR

(71) Applicant: FUJI XEROX CO., LTD., Tokyo (JP)

(72) Inventors: Hideki Yamasaki, Yokohama (JP); Yuichi Kawata, Yokohama (JP); Ryoko Saitoh, Yokohama (JP); Yoshifumi Bando, Yokohama (JP); Kensuke Okamoto, Yokohama (JP); Tomoyo Nishida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 8 days.

(21) Appl. No.: 15/222,047

(22) Filed: Jul. 28, 2016

(65) Prior Publication Data
US 2017/0279995 A1    Sep. 28, 2017

(30) Foreign Application Priority Data

Mar. 25, 2016    (JP) .................................. 2016-061694

(51) Int. Cl.
| | |
|---|---|
| *H04N 1/00* | (2006.01) |
| *G06F 1/32* | (2006.01) |
| *G06F 3/12* | (2006.01) |
| *G06K 15/00* | (2006.01) |

(52) U.S. Cl.
CPC ....... *H04N 1/00891* (2013.01); *G06F 1/3231* (2013.01); *G06F 3/1211* (2013.01); *G06F 3/1238* (2013.01); *G06K 15/406* (2013.01); *G06K 15/4095* (2013.01); *H04N 2201/0094* (2013.01)

(58) Field of Classification Search
None
See application file for complete search history.

(56) References Cited

U.S. PATENT DOCUMENTS 7,889,244 B2 * 2/2011 Tsukizawa .............. G06F 3/012
  348/222.1
9,791,920 B2 * 10/2017 Kim ...................... G06F 3/0483
2006/0066891 A1  3/2006 Ikeda et al.
(Continued)

FOREIGN PATENT DOCUMENTS

JP    200425251    * 9/2004
JP    2007-167292 A    7/2007
(Continued)

OTHER PUBLICATIONS

Jul. 26, 2017 Search Report issued in European Patent Application No. 16185426.0.

*Primary Examiner* — Paul F Payer
(74) *Attorney, Agent, or Firm* — Oliff PLC

(57) ABSTRACT

An information processing apparatus includes a controller that controls the information processing apparatus by making a transition of a state of the information processing apparatus in relation to power consumption of the information processing apparatus from a first state to a second state in which the power consumption is higher than that in the first state, and a line-of-sight detector that detects a line of sight toward the information processing apparatus. The controller makes a transition from the first state to the second state when the line-of-sight detector detects a line of sight toward the information processing apparatus.

14 Claims, 14 Drawing Sheets

(56) References Cited

U.S. PATENT DOCUMENTS

2009/0315674 A1    12/2009   Otake
2013/0010335 A1     1/2013   Baba et al.
2015/0237227 A1     8/2015   Saisho

FOREIGN PATENT DOCUMENTS

| JP | 2009-282126 A | 12/2009 |
| JP | 2009-296001 A | 12/2009 |
| JP | 2010-157789 A | 7/2010 |

* cited by examiner

FIG. 10

| REGION IN IMAGE | DETECTION PERIOD |
|---|---|
| D1 | H1 |
| D2 | H2 (H2<H1) |

INFORMATION PROCESSING APPARATUS AND IMAGE PROCESSING APPARATUS WITH A LINE OF SIGHT DETECTOR

CROSS-REFERENCE TO RELATED APPLICATIONS

This application is based on and claims priority under USC 119 from Japanese Patent Application No. 2016-061694 filed on Mar. 25, 2016.

BACKGROUND

Technical Field

The present invention relates to an information processing apparatus and an image processing apparatus.

SUMMARY

According to an aspect of the invention, there is provided an information processing apparatus, including: a controller that controls the information processing apparatus by making a transition of a state of the information processing apparatus in relation to power consumption of the information processing apparatus from a first state to a second state in which the power consumption is higher than that in the first state; and a line-of-sight detector that detects a line of sight toward the information processing apparatus, wherein the controller makes a transition from the first state to the second state when the line-of-sight detector detects a line of sight toward the information processing apparatus.

BRIEF DESCRIPTION OF DRAWINGS

Examples of the present invention will be described in detail based on the following figures, wherein:

FIG. 10 is a diagram illustrating an instance of a detection period table;

DETAILED DESCRIPTION

[1] Examples

Figure 1:
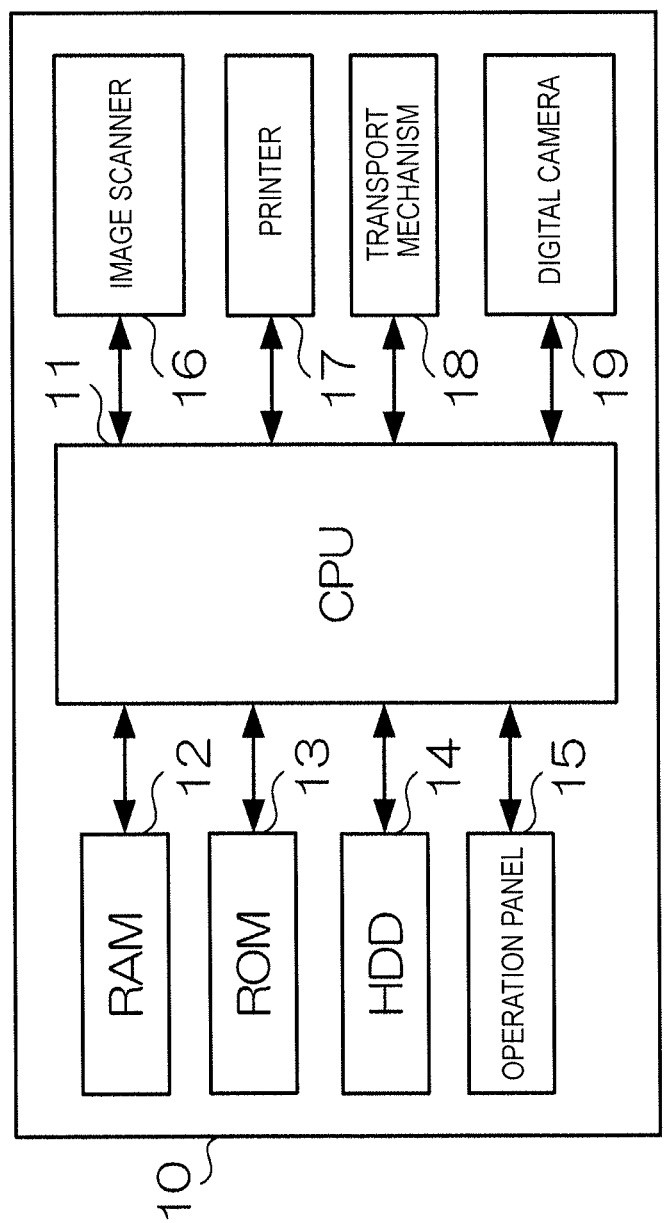
FIG. 1 is a diagram illustrating a hardware configuration of an image processing apparatus according to an example.

FIG. 1 illustrates a hardware configuration of an image processing apparatus 10 according to an example. The image processing apparatus 10 provides image processing functions such as scan, print, copy, and facsimile. The image processing apparatus 10 is a computer which includes a CPU (Central Processing Unit) 11, a RAM (Random Access Memory) 12, a ROM (Read Only Memory) 13, an HDD (Hard Disk Drive) 14, an operation panel 15, an image scanner 16, a printer 17, a transport mechanism 18, and a digital camera 19.

The CPU 11 executes a program stored in the ROM 13 or the HDD 14 using the RAM 12 as a work area to control operations of the respective units. The HDD 14 is a memory which stores data and the program used in the control of the CPU 11. The memory is not limited to the HDD, and may be another recording medium such as an SSD (Solid State Drive).

The operation panel 15 is provided with a touch screen and a button. The operation panel 15 displays information indicating a state of the own apparatus (the image processing apparatus) and a state of the process, and displays an image such as an operator to receive a user's operation, and receives an operation when the button is pressed. In this way, the operation panel 15 is an instance of an operation receiving unit which receives an operation of the own apparatus. The image scanner 16 is provided with an image sensor, and optically reads out an image displayed on the surface of a sheet. The image scanner 16 supplies image data showing the read image to the CPU 11.

The printer 17 forms, for instance, an image on a sheet by an electrophotographic process. The image scanner 16 and the printer 17 both are an instance of a processing unit which performs a process on the sheet. The transport mechanism 18 is a mechanism which transports the sheet, and transports a sheet from which the image is read out by the image scanner 16 and a sheet on which the image is formed by the printer 17. The digital camera 19 is provided with a lens and an image capturing device, and captures a person or a scene of surroundings which are expressed by the incident light passing through the lens. The digital camera 19 in this example is a visible light camera which captures an image with the visible light. The digital camera 19 may be an infrared camera which captures an image with the infrared light, or may be an integration type camera which captures an image using both the infrared light and the visible light.

Figure 2:
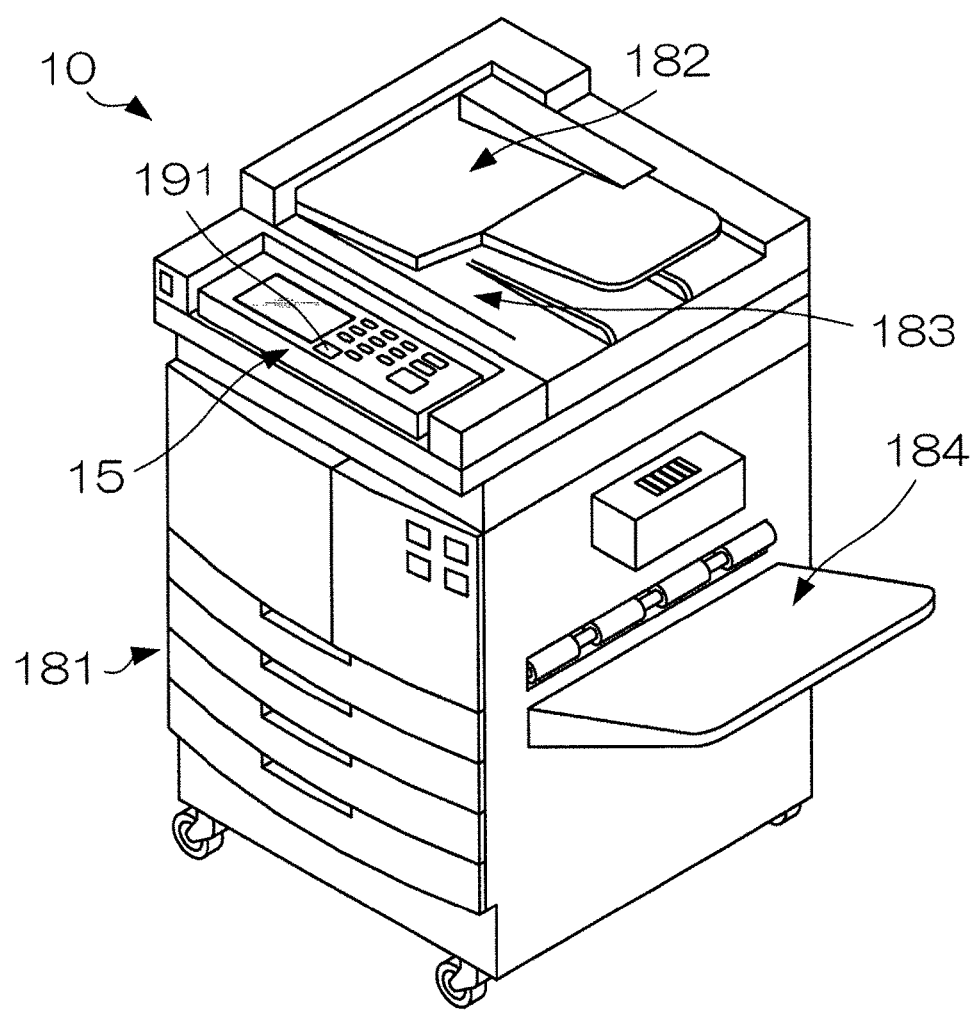
FIG. 2 is a diagram illustrating an outer appearance of the image processing apparatus.

FIG. 2 illustrates an outer appearance of the image processing apparatus 10. The image processing apparatus 10 is assumed as a front face where the operation panel 15 is provided, and is used by the user standing in front of the front face. A sheet feeding tray 181 is provided in the front of the image processing apparatus 10. In addition, an original document feeding unit 182 and an original document receiving unit 183 are provided on the upper portion of the image processing apparatus 10. A paper discharging unit 184 is provided in the side surface of the image processing apparatus 10.

A sheet to form an image is stored in the sheet feeding tray 181. The original document to be scanned is set in the original document feeding unit 182. The sheet feeding tray 181 and the original document feeding unit 182 both are an instance of a sheet feeding unit which supplies the sheet to a processing unit such as the image scanner 16 and the printer 17 described above. The scanned original document is discharged to the original document receiving unit 183. The image-formed sheet is discharged to the paper discharging unit 184. The original document receiving unit 183 and the paper discharging unit 184 both are an instance of a discharging unit to which the sheet processed by the processing unit is discharged.

A lens 191 of the digital camera 19 is provided in the operation panel 15. The user who stands in front of the image processing apparatus 10 is captured by the digital camera 19 through the lens 191.

Figure 3:
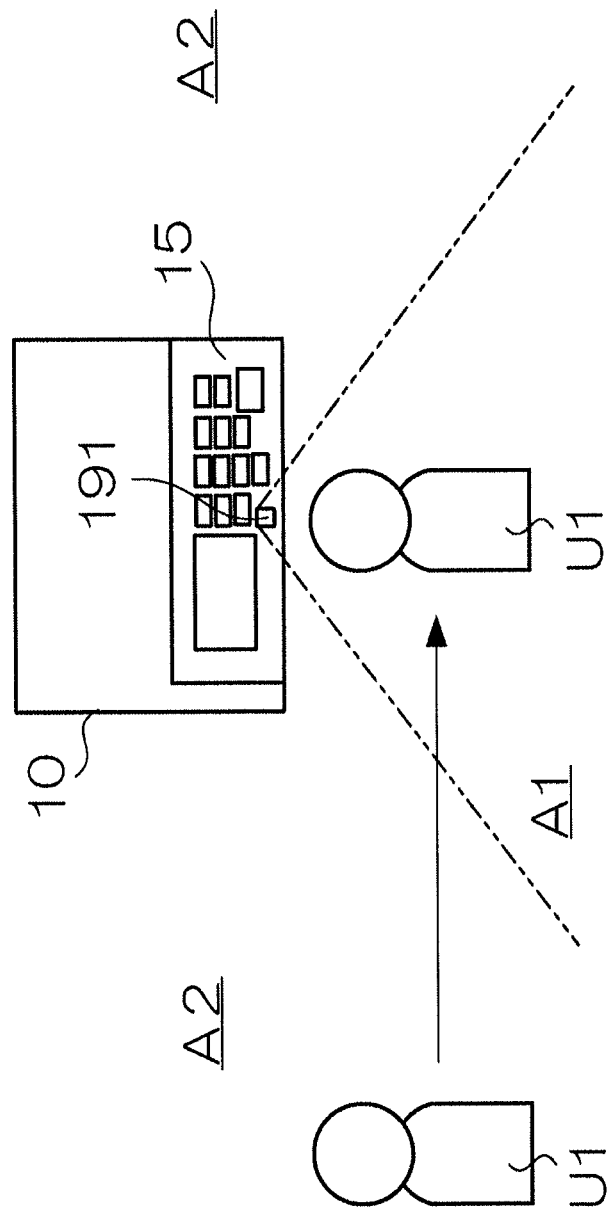
FIG. 3 is a diagram illustrating an instance of an angle of view of a digital camera.

FIG. 3 illustrates an instance of an angle of view of the digital camera 19. In FIG. 3, a region interposed by the two-dot chain lines in front of the image processing apparatus 10 shows a capturing region A1 of the digital camera 19, and the outside regions show a capturing exception region A2.

For instance, when a user U1 in the capturing exception region A2 comes to use the image processing apparatus 10, the user U1 enters the capturing region A1 in order to operate the operation panel 15 and stands in front of the image processing apparatus 10. The digital camera 19 is provided toward a capturing direction of the user at a position in a direction to capture the user who uses the image processing apparatus 10.

Figure 4:
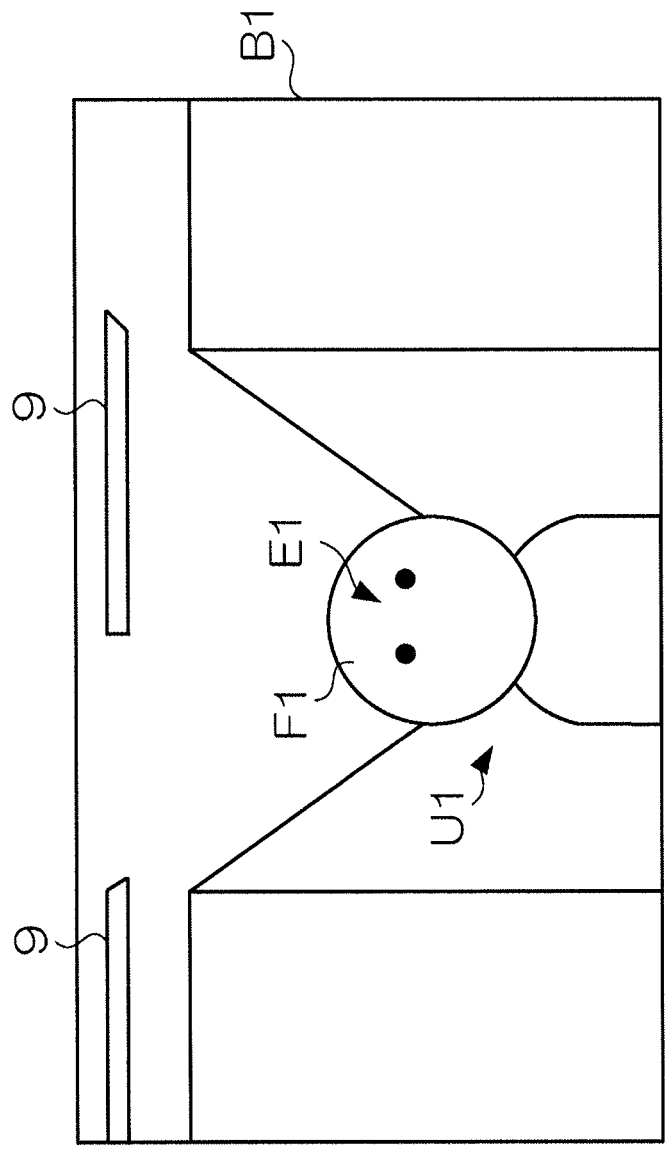
FIG. 4 is a diagram illustrating an instance of a captured image.

FIG. 4 illustrates an instance of a captured image. In FIG. 4, a face F1 and eyes E1 of the user U1 are shown in a captured image B1. In the image processing apparatus 10, the operation panel 15 is provided at a position lower than a height of an adult for the easy operation. The lens 191 of the digital camera 19 provided in the operation panel 15 is provided in a looking-up direction to capture the user's face, for instance. Therefore, a ceiling and a fluorescent light 9 attached to the ceiling are shown in the image B1.

The CPU 11 of the image processing apparatus 10 executes a program to control the respective units, so that functions are realized as will be described below.

Figure 5:
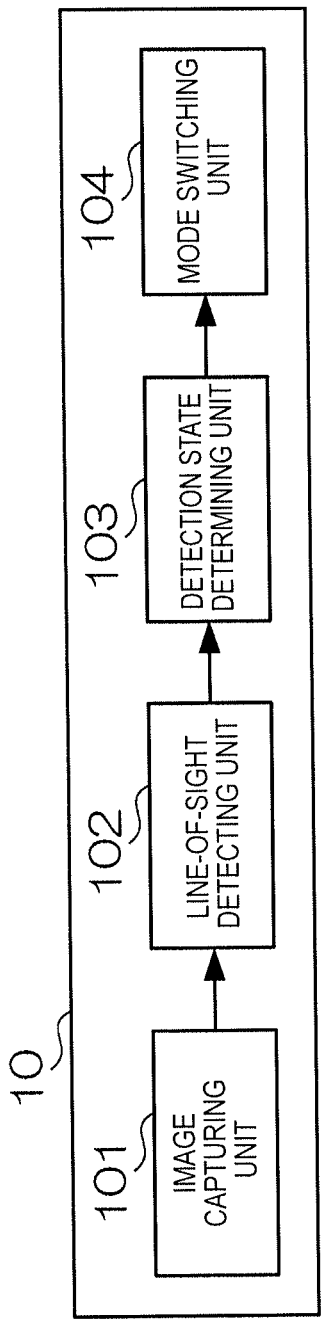
FIG. 5 is a diagram illustrating a functional configuration which is realized by the image processing apparatus.

FIG. 5 illustrates a functional configuration which is realized by the image processing apparatus 10. The image processing apparatus 10 is provided with an image capturing unit 101, a line-of-sight detecting unit 102, a detection state determining unit 103, and a mode switching unit 104. The image capturing unit 101 has a function of capturing the surroundings of the own apparatus, and is realized by the CPU 11 and the digital camera 19 illustrated in FIG. 1, for instance.

The image capturing unit 101 captures the capturing region A1 illustrated in FIG. 3 and captures a face of the user who uses the own apparatus as illustrated in FIG. 4. The image capturing unit 101 repeatedly captures an image in a specific period. The fluorescent light 9 shown in the image captured by the image capturing unit 101 flickers at a double frequency compared with that of a domestic power source (for instance, 100 Hz when the domestic power source is 50 Hz). A capture timing of the image capturing unit 101 may be set in an unflickering period of the fluorescent light 9 when the effect of backlight is less.

Figure 6:
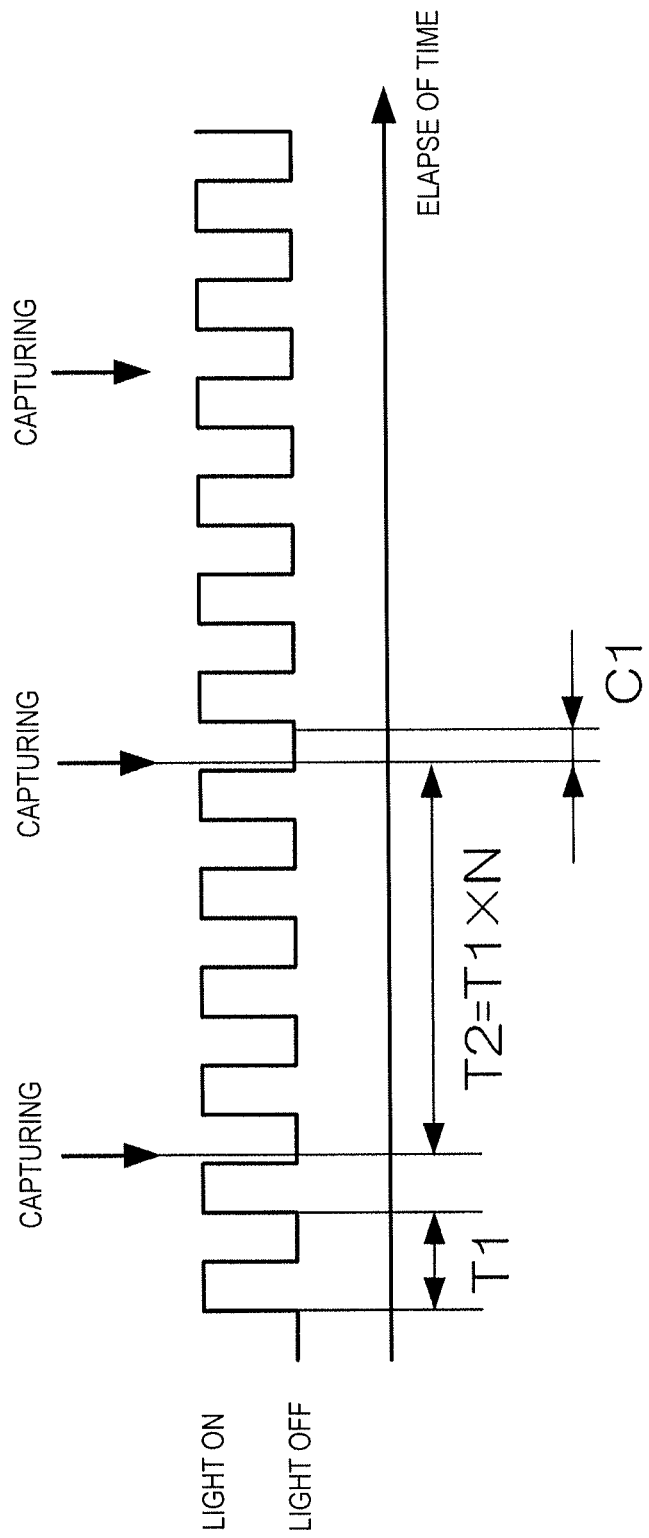
FIG. 6 is a diagram illustrating an instance of a capture timing.

FIG. 6 illustrates an instance of the capture timing. In FIG. 6, the fluorescent light 9 is repeatedly turned on and off at every period T1. With this regard, the image capturing unit 101 repeatedly captures the image in a sampling period T2. The period T2 is a period of T1×N (N is a natural number). In addition, the image capturing unit 101 captures an image at a sampling time C1 such that the capturing time is within the period when the fluorescent light 9 is turned off.

When the turning-on period and the turning-off period share the period T1 half and half, the sampling time C1 corresponds to a speed shorter than the period T1÷2 (when the period T1 is 0.01 second at a frequency of 100 Hz, the sampling time becomes $\frac{1}{250}$ seconds or $\frac{1}{500}$ seconds shorter than 0.005 seconds). The image capturing unit 101 supplies the captured image to the line-of-sight detecting unit 102.

The line-of-sight detecting unit 102 has a function of detecting the light of sight with respect to the own apparatus, and performs an operation (line-of-sight detecting operation) for detecting the line of sight. The line-of-sight detecting unit 102 is an instance of "line-of-sight detector". The line-of-sight detecting unit 102 analyzes the image supplied from the image capturing unit 101. In this example, since the image is captured with the visible light, the line of sight is detected based on a positional relation between a reference point (for instance, the head) and a moving point (for instance, the iris). In other words, the line-of-sight detecting unit 102 detects the line of sight based on the captured image of the surroundings of the own apparatus.

In a case where the image is captured with the infrared light, the line-of-sight detecting unit 102 may detect the line of sight by setting a cornea reflection point as the reference point and a pupil as the moving point. The line-of-sight detecting unit 102 may detect the line of sight using a well-known technology other than the above ones.

In addition, the line-of-sight detecting unit 102 in this example detects the line of sight toward a predetermined place. The predetermined place is, for instance, an interest place of which the user is interested in the own apparatus (specifically, the operation panel 15, the sheet feeding tray 181, the original document feeding unit 182, the original document receiving unit 183, and the paper discharging unit 184 illustrated in FIG. 2). The line-of-sight detecting unit 102 stores the coordinates of the respective interest places. When the detected line of sight is roughly directed toward one of the interest places or the own apparatus, the line-of-sight detecting unit 102 supplies information (detection result information) that the line of sight is directed toward the own apparatus to the detection state determining unit 103. When the line of sight toward the own apparatus is detected for a predetermined time, the line-of-sight detecting unit 102 determines that the line of sight toward the own apparatus is detected.

In a case where the detected line of sight is not directed toward the interest place or the own apparatus, or in a case where the line of sight itself is not detected, the line-of-sight detecting unit 102 supplies information (detection result information) indicating the fact that the line of sight toward the interest place is not detected to the detection state determining unit 103. When the image is supplied from the image capturing unit 101, the line-of-sight detecting unit 102 repeatedly performs the line-of-sight detecting operation and supplies the detection result information at that time to the detection state determining unit 103.

The detection state determining unit 103 determines whether a switching condition for switching the mode of the own apparatus from a power saving mode to a normal mode is satisfied based on a detection state of the line of sight of the line-of-sight detecting unit 102. The normal mode is a mode in which the power is supplied to the respective units of the own apparatus for making a normal operation possible. The power saving mode is a mode in which the power supplied units are limited to save the power consumption as less as possible, or the power supply is lowered compared to the case of the normal mode. In the power saving mode, the power consumption is less than that in the normal mode.

However, even in the power saving mode, the power is supplied to the respective units illustrated in FIG. 5, that is, the image capturing unit 101, the line-of-sight detecting unit 102, the detection state determining unit 103, and the mode switching unit 104). In other words, the power saving mode is a mode for operating at least the respective units illustrated in FIG. 5. The state of the image processing apparatus 10 operated in the power saving mode is an instance of a "first state". The state of the image processing apparatus 10 operated in the normal mode is an instance of a "second state". The first state and the second state both are the states of the image processing apparatus 10 related to the power consumption. The second state is a state having higher power consumption with respect to the first state.

For instance, when the line of sight toward the interest place is detected by the line-of-sight detecting unit 102, the detection state determining unit 103 determines whether the switching condition to be switched from the power saving mode to the normal mode is satisfied based on the detection state.

For instance, in a case where a predetermined detection period is 2.0 seconds, the ratio is 70%, and the sampling period T2 is 0.1 second, the detection state determining unit 103 determines that the switching condition is satisfied when fourteen or more pieces of the detection result information among twenty pieces of the detection result information supplied during 2.0 seconds indicate that the line of sight toward the interest place or the own apparatus is detected after the detection result information indicating that the line of sight toward the interest place is detected is supplied from the line-of-sight detecting unit 102. When there are detected fourteen or less pieces of the detection result information indicating that the line of sight toward the interest place, the detection state determining unit 103 determines that the switching condition is not satisfied. In a case where it is determined that the switching condition is satisfied, the detection state determining unit 103 notifies the fact to the mode switching unit 104.

The mode switching unit 104 has a function of switching the mode of the own apparatus. For instance, in a case where a period having no user's operation in the own apparatus exceeds a predetermined length, the mode switching unit 104 switches the mode of the own apparatus from the normal mode to the power saving mode. The mode switching unit 104 performs the switching from the power saving mode to the normal mode according to the detection state of the line-of-sight detecting unit 102.

Specifically, in a case where the fact that the switching condition is satisfied is notified from the detection state determining unit 103 (that is, in a case where a predetermined ratio of the line of sight toward the interest place or the own apparatus is detected among the line-of-sight detections performed during the detection period), the mode switching unit 104 performs the switching from the power saving mode to the normal mode. When the line-of-sight detecting unit 102 detects the line of sight, the mode switching unit 104 performs the switching to control the own apparatus to transition from the first state to the second state. The mode switching unit 104 is an instance of a "controller".

The image processing apparatus 10 performs a mode switching process in which the mode of the own apparatus is switched based on the above configuration.

Figure 7:
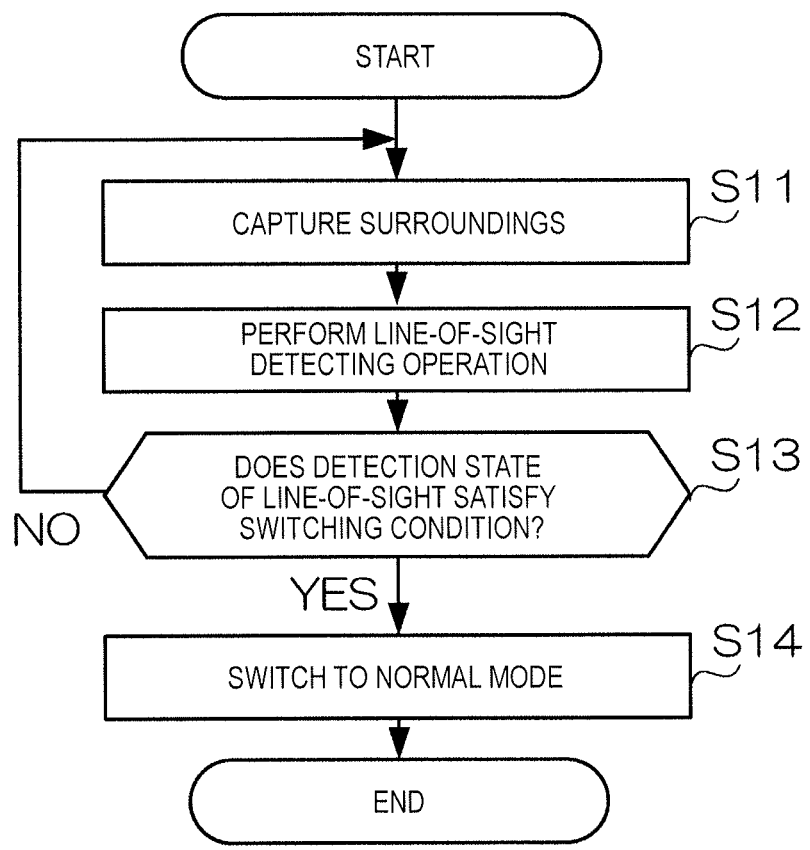
FIG. 7 is a diagram illustrating an instance of an operational sequence of the image processing apparatus 10 in a mode switching process.

FIG. 7 illustrates an instance of an operational sequence of the image processing apparatus 10 in the mode switching process. The operational sequence starts when the image processing apparatus 10 is switched from the normal mode to the power saving mode.

First, the image processing apparatus 10 (the image capturing unit 101) captures an image of the surroundings of the own apparatus (Step S11). Next, the image processing apparatus 10 (the line-of-sight detecting unit 102) performs the line-of-sight detecting operation for detecting the line of sight toward the interest place (Step S12). Subsequently, the image processing apparatus 10 (the detection state determining unit 103) determines whether the detection state of the line of sight satisfies the switching condition (Step S13).

In a case where it is determined in Step S13 that the switching condition is not satisfied (NO), the image processing apparatus 10 returns to Step S11 and continues to operate. In a case where it is determined in Step S13 that the switching condition is satisfied (YES), the image processing apparatus 10 (the mode switching unit 104) switches the mode of the own apparatus from the power saving mode to the normal mode (Step S14).

As described above, when the own apparatus is used by the user, the image processing apparatus 10 is used to switch the mode related to the power supply of the own apparatus from the power saving mode to the normal mode. In related arts, there is a method of switching the mode when a motion sensor detects the approach of a person for instance. In this case, the mode may be switched only when a person passes by. In this example, since the mode is switched in a case where the line of sight is detected, the mode is hardly switched only just when a person passes by compared to a case where the mode is switched when the approach of a person is detected.

In this example, the line of sight toward the interest place is detected. For instance, when the line of sight toward the operation panel 15 is detected, the approach of the user who tries to operate the own apparatus is detected. In addition, when the line of sight toward the sheet feeding tray 181 and the original document feeding unit 182 is detected, the approach of the user who tries to set a sheet in the own apparatus is detected.

In this example, in a case where the line of sight is detected in a predetermined ratio of the operation among the line-of-sight detecting operations performed in the detection period even when the approaching user who tries to use the image processing apparatus 10 instantaneously averts the line of sight from the interest place or the own apparatus, the mode related to the power supply is switched from the power saving mode to the normal mode.

In this example, the line of sight is detected in a period when the emission of the fluorescent light is less affected. Therefore, the user's face is not backlit with the fluorescent light, so that the detection accuracy of the line of sight is improved compared to a case where the emission period of the fluorescent light is not taken into consideration.

[2] Modification Examples

The above-described example is given as a mere instance, and may be modified as follows. In addition, the example and the respective modification examples may be implemented in combination with each other as needed.

[2-1] Detection Period

In the example, the detection period used in determination on the switching condition may be changed. For instance, the detection period may be changed according to the position of the eye of which the line of sight is detected by the line-of-sight detecting unit 102 in the image used for detecting the line of sight toward the interest place. In this case, the image processing apparatus 10 dissects the image into plural regions and stores region information indicating the dissected regions.

Figure 8:
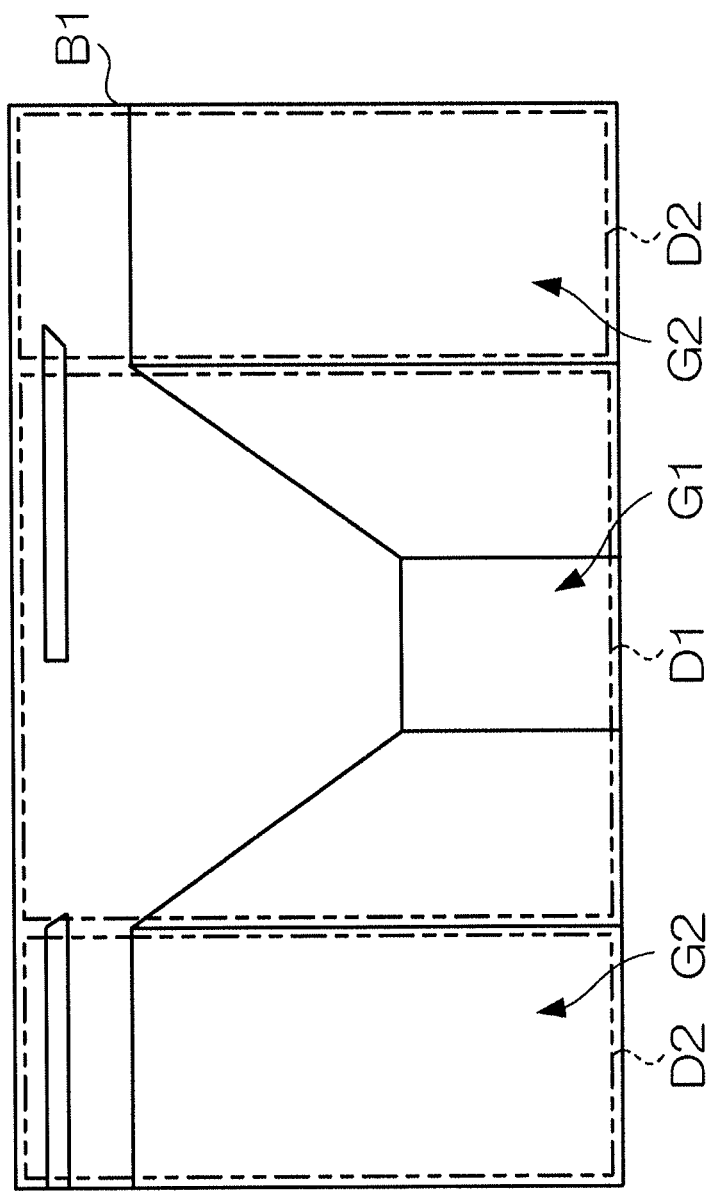
FIG. 8 is a diagram illustrating an instance of dissected regions.

FIG. 8 illustrates an instance of the dissected regions. In the instance of FIG. 8, the image B1 captured by the image capturing unit 101 is illustrated. In the image B1, a corridor G1 extending in the front direction of the image processing apparatus 10 and a corridor G2 extending in the lateral direction of the image processing apparatus 10 are illustrated. In this instance, the image is dissected into a region D1 showing the corridor G1 and a region D2 in the region showing the corridor G2 except the region D1.

Figure 9:
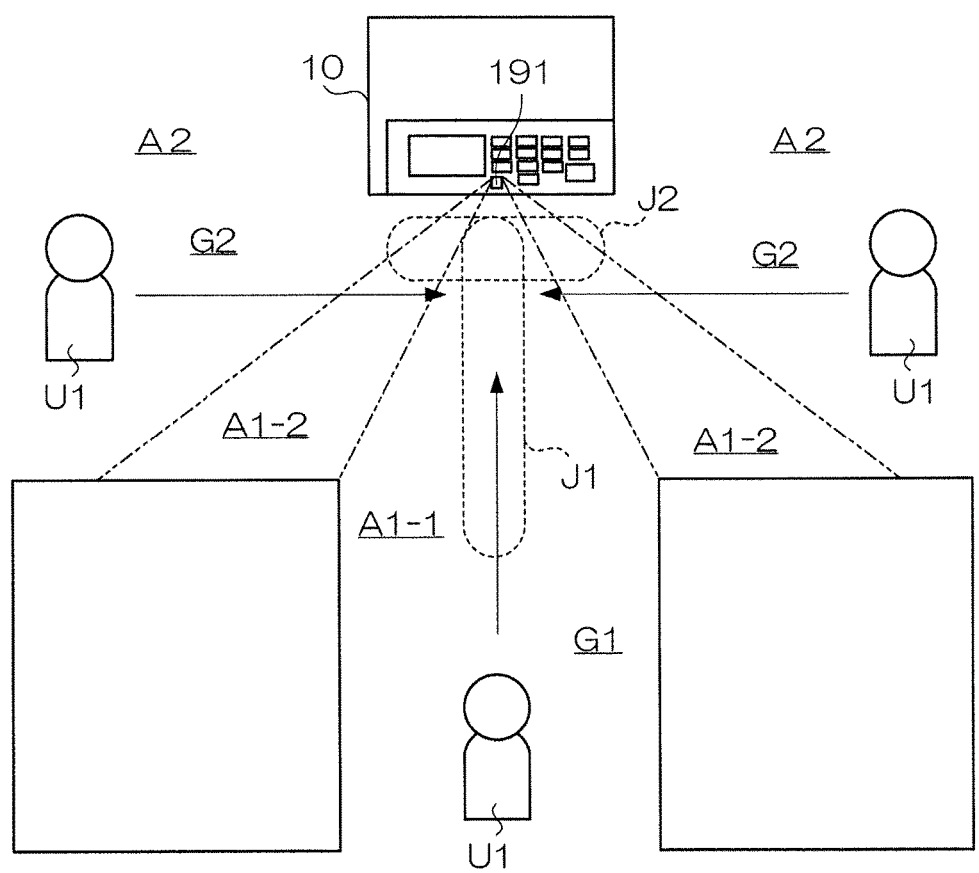
FIG. 9 is a diagram illustrating an instance of a relation between a user's path and the dissected regions.

FIG. 9 illustrates an instance of a relation between a user's path and the dissected regions. In FIG. 9, the corridors G1 and G2, a capturing region A1-1, a capturing region A1-2, and the capturing exception region A2 when viewed from the ceiling are illustrated. The capturing region A1-1 corresponds to the region D1 illustrated in FIG. 8 in the actual space captured by the image capturing unit 101. The capturing region A1-2 corresponds to the region D2 illustrated in FIG. 8 in the actual space captured by the image capturing unit 101.

In a case where the user U1 passes through the corridor G1 to use the image processing apparatus 10, and when the user U1 positioned in a region J1 in the drawing turns the line of sight toward the interest place of the image processing apparatus 10, the line of sight is detected. On the other hand, in a case where the user U1 passes through the corridor G2, and when the user U1 positioned in a region J2 in the drawing turns the line of sight toward the interest place of the image processing apparatus 10, the line of sight is detected. Since a distance passing through the corridor G1 is farther than a distance passing through the corridor G2, the face of the user U1 is captured. Therefore, the region J1 is larger than the region J2.

The detection state determining unit 103 of this modification uses a detection period table in which the regions in the image are associated with the detection periods.

FIG. 10 illustrates an instance of the detection period table. In the instance of FIG. 10, the detection period "H1" is associated with the region "D1" of FIG. 8, and the detection period "H2 (H2<H1)" is associated with the region "D2" of FIG. 8. For instance, when the position of the eye when the line of sight toward the interest place is detected is in the region D1 for the first time, the detection state determining unit 103 performs the determination on the switching condition based on the detection period H1. When the position of the eye at that time is in the region D2, the detection state determining unit 103 performs the determination on the switching condition based on the detection period H2.

The detection state determining unit 103 may perform the determination on the switching condition using not only the position of the eye at the first detection time but also the position of the eye at the second detection time or an intermediate position of the first two detected positions. In either case, after the line of sight is detected, the mode switching unit 104 switches the mode when the line of sight is detected in the line-of-sight detecting operation matched to the condition among the line-of-sight detecting operations performed in the detection period according to the position of the eye of which the line of sight is detected in the captured image.

When the detection period H1 matched to the length of the region J1 illustrated in FIG. 9 is uniformly used, a time taken until the user coming close to the image processing apparatus 10 through the corridor G2 waits for the mode change becomes long compared to a case where the detection period H2 is used. On the other hand, when the short detection period H2 matched to the length of the region J2 is used, the mode switching due to the detection of the line of sight of the user who comes through the corridor G1 but passes before the image processing apparatus 10 and then proceeds to the corridor G2 easily occurs compared to the case of using the detection period H1.

In this modification example, the period according to the position of the eye of which the line of sight in the captured image is detected is used as the detection period. Therefore, the time taken until the user waits for the mode switching becomes short. It is suppressed that the mode is switched due to the detection of the line of sight of the user who will not use the image processing apparatus 10. The period according to the position of the eye may also be used for the period determined with respect to the switching condition in the past described in the modification example (the detection period in the modification example). Even in this case, the time waiting for the mode switching becomes short, and an erroneous mode switching is suppressed.

[2-2] Detection of Approach

The image processing apparatus may be provided with a motion sensor to detect an approaching user.

Figure 11:
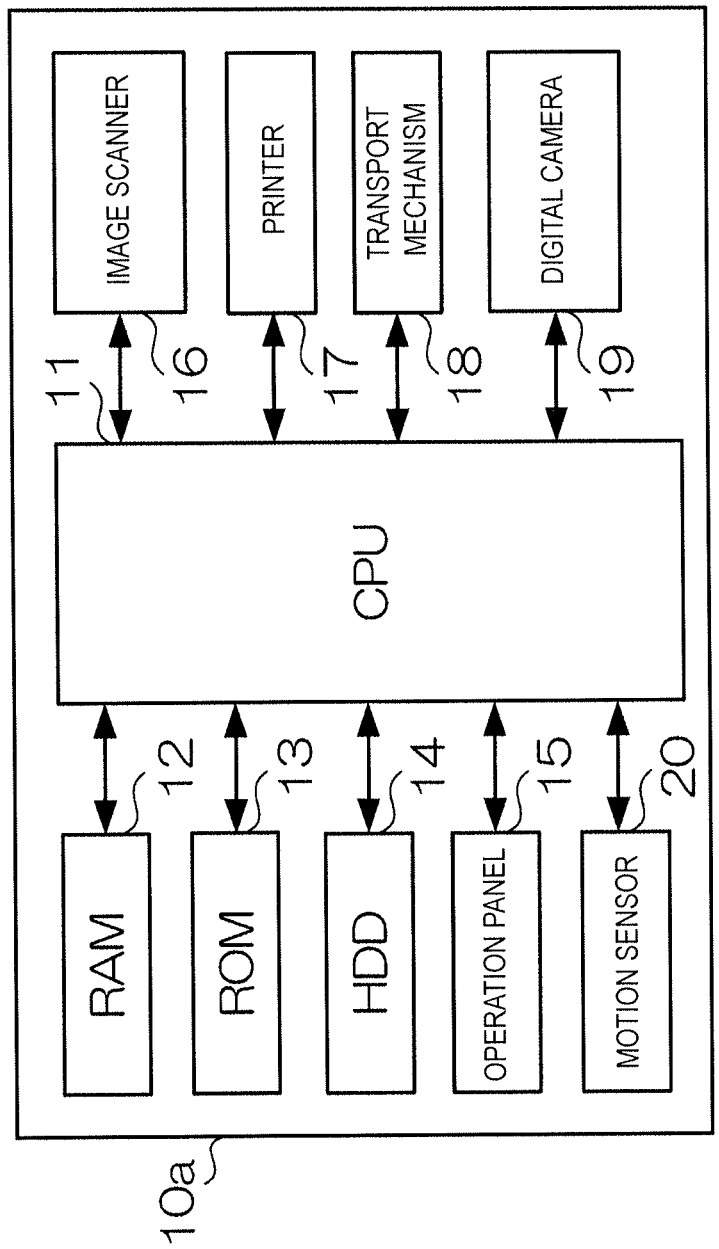
FIG. 11 is a diagram illustrating a hardware configuration of an image processing apparatus according to a modification.

FIG. 11 illustrates a hardware configuration of an image processing apparatus 10a according to this modification example. The image processing apparatus 10a is provided with a motion sensor 20 in addition to the hardware configuration illustrated in FIG. 1. The motion sensor 20 is a sensor for detecting whether a person approaches by measuring a reflecting quantity of infrared light, ultrasonic waves, or visible light. When measuring the reflecting quantity indicating that a person approaches, the motion sensor 20 notifies the fact to the CPU 11.

Figure 12:
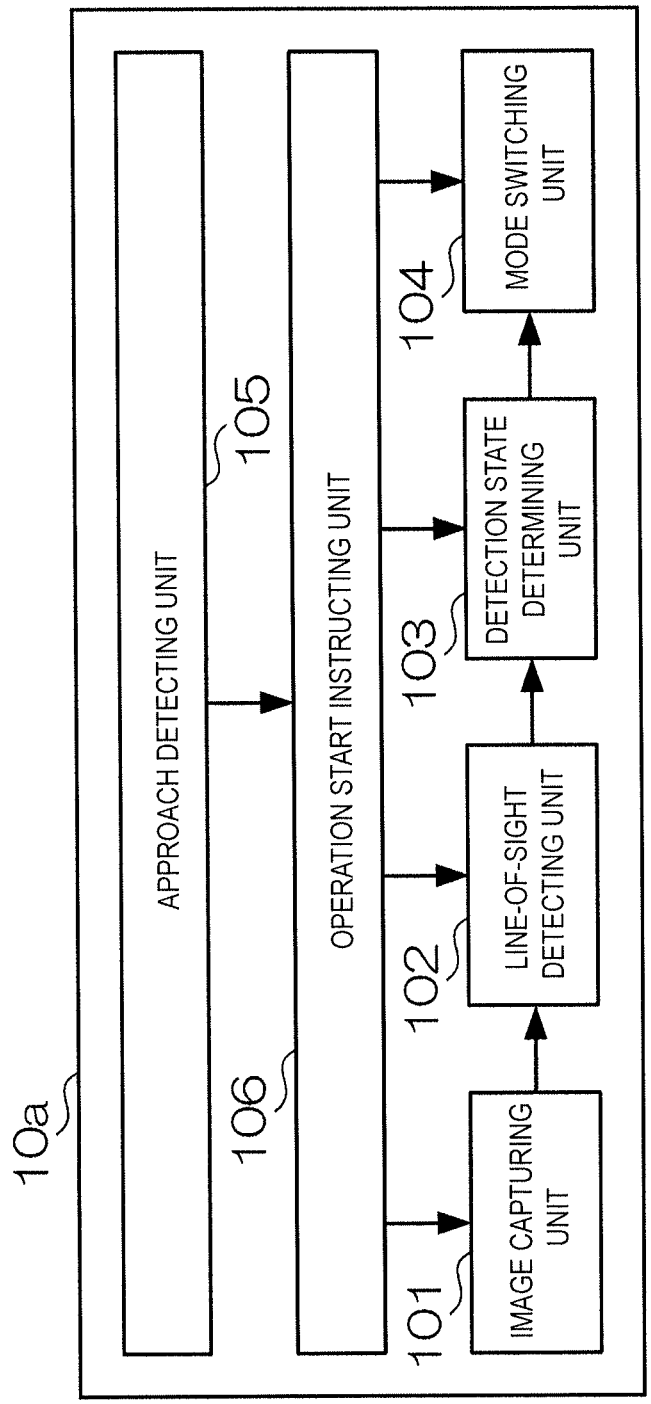
FIG. 12 is a diagram illustrating a functional configuration which is realized by the image processing apparatus.

FIG. 12 illustrates a functional configuration which is realized by the image processing apparatus 10a. The image processing apparatus 10a is provided with an approach detecting unit 105 and an operation start instructing unit 106 in addition to the respective units illustrated in FIG. 5. The approach detecting unit 105 detects whether a person approaches the own apparatus. The approach detecting unit 105 is an instance of an "approach detector". When an approach of a person is detected by the motion sensor 20, the approach detecting unit 105 notifies the fact to the operation start instructing unit 106.

In a case where the approach of a person is detected by the approach detecting unit 105, the operation start instructing unit 106 instructs the image capturing unit 101, the line-of-sight detecting unit 102, the detection state determining unit 103, and the mode switching unit 104 to start their operations. For instance, in a case where the approach detecting unit 105 is configured with a camera and monitors a tiptoe of an approaching person for instance while the tiptoe is lain in a direction approaching the own apparatus, the determination on whether the person will use the own apparatus can be more accurately performed by detecting the line of sight of the person.

Alternatively, in a case where a direction of the face of an approaching person is monitored in place of the tiptoe of the approaching person and the face is directed to the own apparatus, the determination on whether the person will use the own apparatus can be more accurately performed by detecting the line of sight of the person. In addition, in the image processing apparatus mounted with an authentication unit, the face used for determining the direction of the face can be used for determining the authentication, or the iris of the eye used in the line-of-sight detecting unit can be used for determining the authentication, so that a trouble in authentication can be alleviated.

When the instructions are received, the image capturing unit 101 starts to capture the surroundings. When the approach of a person toward the own apparatus is detected by the approach detecting unit 105, the line-of-sight detecting unit 102 starts the line-of-sight detecting operation. Therefore, the line-of-sight detecting unit 102 detects the line of sight toward the own apparatus with respect to the person detected by the approach detecting unit 105. The detection state determining unit 103 starts to determine a state of the line-of-sight detection, and the mode switching unit 104 starts to switch the mode. When the instructions are issued by the operation start instructing unit 106, the approach detecting unit 105 and the operation start instructing unit 106 end their operations.

Therefore, the capturing of the image capturing unit 101 and the line-of-sight detecting operation of the line-of-sight detecting unit 102 are not operated until the person approaches the own apparatus. In addition, for instance, when the power consumption of the respective units illustrated in FIG. 5 is larger than the power consumed by the operations of the approach detecting unit 105 and the operation start instructing unit 106, and the mode is switched to the power saving mode, the power consumption in the power saving mode is reduced compared to a case where the operations of the respective units illustrated in FIG. 5 start.

[2-3] Line-of-Sight Detection

The above description in the example has been made about that the line-of-sight detecting unit 102 detects the line of sight toward the interest place. However, the line-of-sight detecting unit 102 may detect not only a local interest place but also the line of sight even when the line of sight is large enough to cover the size of the own apparatus.

[2-4] Image Capturing

The image processing apparatus may not capture an image.

Figure 13:
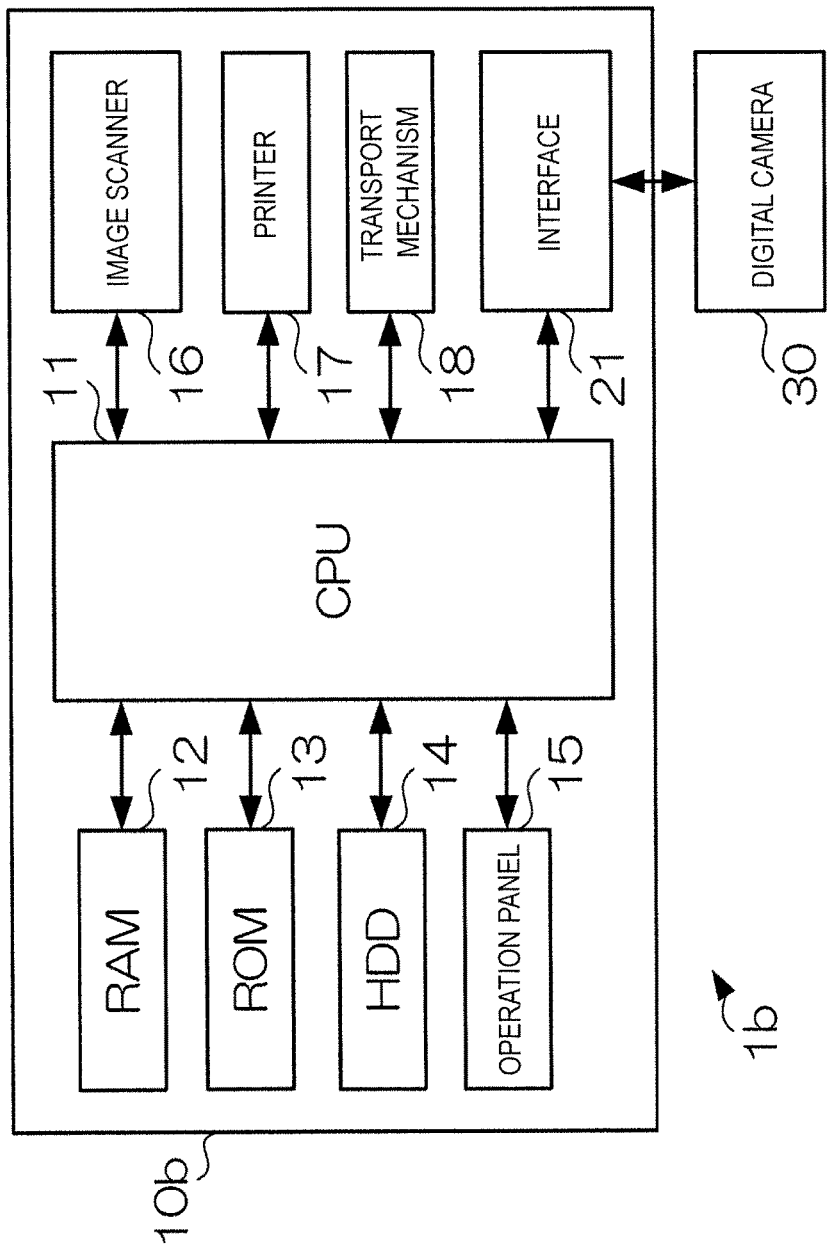
FIG. 13 is a diagram illustrating a hardware configuration of an image processing system according to the modification.

FIG. 13 illustrates a hardware configuration of an image processing system 1b according to this modification. The image processing system 1b is provided with an image processing apparatus 10b and a digital camera 30. The image processing apparatus 10b is provided with the configurations from the CPU 11 to the transport mechanism 18 illustrated in FIG. 1, and an interface 21.

The interface 21 relays the exchange of data with the digital camera 30. The digital camera 30 is provided around the image processing apparatus 10b, and captures the surroundings of the image processing apparatus 10b containing a place where the user stands to use the image processing apparatus 10b.

Figure 14:
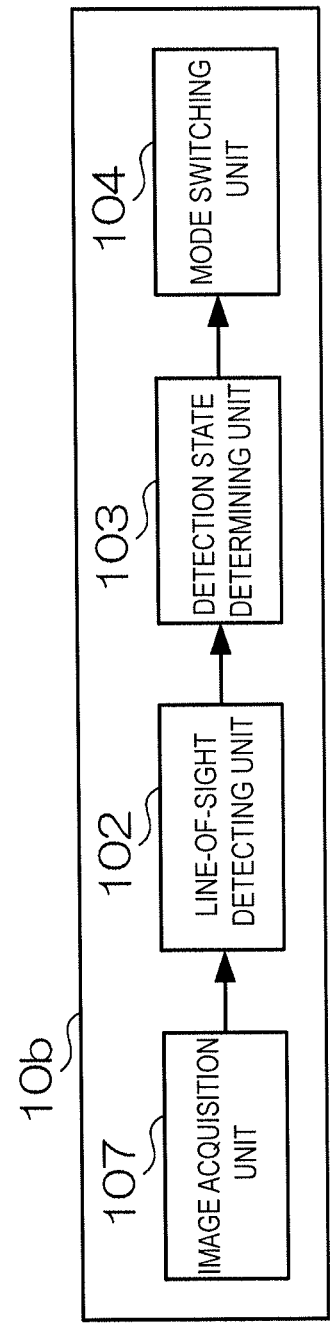
FIG. 14 is a diagram illustrating a functional configuration which is realized by the image processing apparatus.

FIG. 14 illustrates a functional configuration to be realized by the image processing apparatus 10b. The image processing apparatus 10b is provided with the line-of-sight detecting unit 102, the detection state determining unit 103, the mode switching unit 104, and an image acquisition unit 107. The image acquisition unit 107 acquires an image obtained by capturing the surroundings of the own apparatus from an external capturing device (the digital camera 30 in this instance). The line-of-sight detecting unit 102 performs the line-of-sight detecting operation based on the image captured by the image acquisition unit 107, that is, the image containing the surroundings of the own apparatus.

[2-5] Modes

The modes switched by the mode switching unit 104 are not limited to those described in the example. For instance, the normal mode has been described as a mode in which the power to the respective units of the own apparatus is not limited. However, the normal mode may be a mode in which the power is limited for a specific function. In addition, the other functions may be supplied with power in the power saving mode in addition to the respective units illustrated in FIG. 5. Even in any case, the mode switching unit 104 may switch the mode from a first mode to a second mode (in this case, the second mode is a mode in which the power consumption is larger than that in the first mode) according to the detection state of the line-of-sight detecting unit 102.

[2-6] Information Processing Apparatus

The above respective instances have been described about the image processing apparatus which performs image processing, but the invention may be applied to another information processing apparatus without being limited thereto. For instance, when the invention is applied to an information processing apparatus such as a kiosk terminal, an ATM (Automatic Teller Machine), and an automatic ticket machine which is installed at a place where an unspecified large number of users visit to use, the mode is not changed only just by the user who passes by as described in the example, so that it is convenient.

[2-7] Category of Invention

The invention is implemented as an information processing method which realizes a process of the information processing apparatus besides the information processing apparatus for realizing the respective units illustrated in FIG. 5 similarly to the above-described image processing system, and is implemented as a program which, when executed by a computer, causes the computer to perform a function of controlling the information processing apparatus. The program may be provided in a form of a recording medium such as an optical disk storing the program therein, or may be installed and usable by being downloaded to the computer through a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a controller that controls the information processing apparatus by making a transition of a state from a first state to a second state in which the power consumption is higher than that in the first state; and a line-of-sight detector, wherein the controller makes a transition from the first state to the second state when the line-of-sight detector satisfies a predetermined detection ratio of line-of-sight toward the information processing apparatus during a predetermined period, and the predetermined detection ratio is less than 1.

2. The information processing apparatus according to claim 1, wherein the line-of-sight detector determines that the line of sight toward the information processing apparatus is detected in a case where the line of sight toward the information processing apparatus is detected for a predetermined time.

3. The information processing apparatus according to claim 2, further comprising:

an authentication unit that authenticates a person based on a face or an iris of an eye of the person whose line of sight is detected.

4. The information processing apparatus according to claim 1, further comprising:

an approach detector that detects whether a person approaches the information processing apparatus, wherein, in a case where the approach detector detects a person, the line-of-sight detector detects a line of sight of the person toward the information processing apparatus.

5. The information processing apparatus according to claim 4, wherein the approach detector detects whether a person approaches the information processing apparatus based on a direction of a tiptoe of the person.

6. The information processing apparatus according to claim 4, wherein the approach detector detects whether a person approaches the information processing apparatus based on a direction of a face of the person.

7. An image processing apparatus, comprising:

the information processing apparatus according to claim 1.

8. An information processing apparatus, comprising:

a controller that controls the information processing apparatus by making a transition of a state from a first state to a second state in which the power consumption is higher than that in the first state; and a line-of-sight detector, wherein the controller makes a transition from the first state to the second state when a detection state of the line-of-sight detector satisfies a condition including a predetermined ratio of (1) a number of line-of-sight detections toward the information processing apparatus to (2) a total number of a plurality of line-of-sight detections performed by the line-of sight detector during a predetermined period, and the predetermined detection ratio is less than 1.

9. The information processing apparatus according to claim 8, wherein the line-of-sight detector determines that the line of sight toward the information processing apparatus is detected in a case where the line of sight toward the information processing apparatus is detected for a predetermined time.

10. The information processing apparatus according to claim 8, further comprising:

an authentication unit that authenticates a person based on a face or an iris of an eye of the person whose line of sight is detected.

11. The information processing apparatus according to claim 8, further comprising:

an approach detector that detects whether a person approaches the information processing apparatus, wherein, in a case where the approach detector detects a person, the line-of-sight detector detects a line of sight of the person toward the information processing apparatus.

12. The information processing apparatus according to claim 11, wherein the approach detector detects whether a person approaches the information processing apparatus based on a direction of a tiptoe of the person.

13. The information processing apparatus according to claim 11, wherein the approach detector detects whether a person approaches the information processing apparatus based on a direction of a face of the person.

14. An image processing apparatus, comprising:

the information processing apparatus according to claim 8.

* * * * *